(12) United States Patent
Gilman et al.

(10) Patent No.: US 10,436,601 B2
(45) Date of Patent: Oct. 8, 2019

(54) INFORMATION DISPLAY SYSTEM AND METHOD

(71) Applicant: Ford Global Technologies, LLC, Dearborn, MI (US)

(72) Inventors: Dale Gilman, Beverly Hills, MI (US); Paul Aldighieri, Grosse Pointe Farms, MI (US); David L. Watson, Ann Arbor, MI (US); Craig Sandvig, Sterling Heights, MI (US); Leslie Bodnar, Dearborn, MI (US); Jeffrey Allen Greenberg, Ann Arbor, MI (US); Angela L. Watson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 15/457,298

(22) Filed: Mar. 13, 2017

(65) Prior Publication Data

US 2017/0184413 A1    Jun. 29, 2017

Related U.S. Application Data

(63) Continuation of application No. 12/985,717, filed on Jan. 6, 2011, now Pat. No. 9,696,176.

(51) Int. Cl.
*G01C 21/36* (2006.01)
*B60K 35/00* (2006.01)
(Continued)

(52) U.S. Cl.
CPC .......... *G01C 21/3697* (2013.01); *B60K 35/00* (2013.01); *B60K 2350/1092* (2013.01);
(Continued)

(58) Field of Classification Search
None
See application file for complete search history.

(56) References Cited

U.S. PATENT DOCUMENTS

| 2,685,198 A | 8/1954 | Saul, Sr. |
| 3,977,238 A | 8/1976 | Byington, Jr. |

(Continued)

FOREIGN PATENT DOCUMENTS

| CA | 2867447 A1 | 9/2013 |
| CN | 1321594 A | 11/2001 |

(Continued)

OTHER PUBLICATIONS

U.S. Appl. No. 12/985,420 (FMC 3490 PUS), filed Jan. 6, 2011, 23 pgs.

(Continued)

*Primary Examiner* — John C Kuan
(74) *Attorney, Agent, or Firm* — Michael J. Spenner; Brooks Kushman P.C.

(57) ABSTRACT

A trip gauge for a vehicle information display may convey vehicle trip information and vehicle range information graphically to assist drivers in qualitatively visualizing and determining whether they can successfully make it to their destination before an on-board energy source is depleted. The trip gauge may include indicators corresponding to the relative locations of the vehicle, the destination, and a projected zero charge location associated with the vehicle's range or distance to empty value. Moreover, the positions of the indicators relative to one another may indicate whether the excess energy is available for the vehicle to reach the destination or whether the energy available is insufficient. Accordingly, drivers may be either reassured that they are (Continued)

expected to reach their destination successfully or warned if they are not so the drivers can modify their driving behavior or change their destination.

11 Claims, 3 Drawing Sheets

(51) Int. Cl.
  *G01D 7/02* (2006.01)
  *G01D 7/04* (2006.01)
(52) U.S. Cl.
  CPC .. *B60K 2370/154* (2019.05); *B60K 2370/174* (2019.05); *B60K 2370/186* (2019.05); *B60L 2260/52* (2013.01); *G01D 7/02* (2013.01); *G01D 7/04* (2013.01); *Y02T 10/84* (2013.01)

(56) References Cited

U.S. PATENT DOCUMENTS

| | | | |
|---|---|---|---|
| 4,050,295 A | | 9/1977 | Harvey |
| 4,113,046 A | | 9/1978 | Arpino |
| 4,570,226 A | | 2/1986 | Aussedat |
| 4,590,568 A | | 5/1986 | Barske et al. |
| 5,006,829 A | | 4/1991 | Miyamoto et al. |
| 5,459,666 A | | 10/1995 | Casper et al. |
| 5,534,759 A | | 7/1996 | Evans et al. |
| 5,916,298 A | | 6/1999 | Kroiss et al. |
| 6,128,571 A | * | 10/2000 | Ito ............... G01C 21/3679 340/995.24 |
| 6,453,731 B1 | | 9/2002 | Yaegashi |
| 6,467,337 B2 | | 10/2002 | Sadahiro et al. |
| 6,480,106 B1 | | 11/2002 | Crombez et al. |
| 6,662,102 B2 | | 12/2003 | Katayama et al. |
| 6,748,319 B2 | | 6/2004 | Aoki et al. |
| 7,024,306 B2 | | 4/2006 | Minami et al. |
| 7,072,762 B2 | | 7/2006 | Minami et al. |
| 7,079,018 B2 | | 7/2006 | Hottebart et al. |
| 7,237,203 B1 | | 6/2007 | Kuenzner |
| 7,865,276 B2 | | 1/2011 | Skaff et al. |
| 7,925,438 B2 | | 4/2011 | Lo |
| 7,996,125 B2 | | 8/2011 | Skaff et al. |
| 8,289,143 B2 | | 10/2012 | Mizutani et al. |
| 8,554,399 B2 | | 10/2013 | Fleckner et al. |
| 8,761,980 B2 | | 6/2014 | Kimoto |
| 8,860,565 B2 | | 10/2014 | Skaff et al. |
| 9,378,595 B2 | | 6/2016 | Esler et al. |
| 9,499,065 B2 | | 11/2016 | Skaff et al. |
| 2003/0006914 A1 | | 1/2003 | Todoriki et al. |
| 2004/0218197 A1 | | 11/2004 | Vliembergen et al. |
| 2005/0080556 A1 | | 4/2005 | Toelle |
| 2007/0247291 A1 | | 10/2007 | Masuda et al. |
| 2008/0163811 A1 | | 7/2008 | Nakamichi |
| 2009/0040033 A1 | | 2/2009 | Uchida |
| 2009/0157267 A1 | | 6/2009 | Shin et al. |
| 2009/0157290 A1 | | 6/2009 | Ji et al. |
| 2009/0243827 A1 | | 10/2009 | Burke et al. |
| 2009/0288636 A1 | | 11/2009 | Saito et al. |
| 2010/0026505 A1 | | 2/2010 | Wang et al. |
| 2010/0057280 A1 | | 3/2010 | Crowe et al. |
| 2010/0057281 A1 | | 3/2010 | Lawyer et al. |
| 2010/0073156 A1 | | 3/2010 | Gohring et al. |
| 2010/0106351 A1 | | 4/2010 | Hanssen et al. |
| 2010/0106401 A1 | | 4/2010 | Naito et al. |
| 2010/0168944 A1 | | 7/2010 | Otake |
| 2010/0219945 A1 | | 9/2010 | Schumann et al. |
| 2010/0236847 A1 | | 9/2010 | Yang et al. |
| 2010/0241301 A1 | | 9/2010 | Yang |
| 2010/0265050 A1 | | 10/2010 | Skaff et al. |
| 2010/0274394 A1 | | 10/2010 | Wijaya et al. |
| 2011/0032110 A1 | | 2/2011 | Taguchi |
| 2011/0043346 A1 | | 2/2011 | Hoffmeister |
| 2011/0112710 A1 | * | 5/2011 | Meyer-Ebeling ............ B60L 15/2045 701/22 |
| 2011/0178670 A1 | | 7/2011 | Perkins et al. |
| 2011/0187550 A1 | | 8/2011 | Ringenwald |
| 2011/0241861 A1 | | 10/2011 | Levy et al. |
| 2012/0035843 A1 | | 2/2012 | Miura et al. |
| 2012/0089936 A1 | | 4/2012 | Chiu et al. |
| 2012/0112696 A1 | | 5/2012 | Ikeda et al. |
| 2012/0116606 A1 | | 5/2012 | Ichinokawa |
| 2012/0116670 A1 | | 5/2012 | Rosekrans |
| 2012/0139922 A1 | | 6/2012 | Heo |
| 2012/0197517 A1 | | 8/2012 | Sengoku et al. |
| 2012/0203449 A1 | | 8/2012 | Sengoku et al. |
| 2012/0293122 A1 | | 11/2012 | Murawaka |
| 2012/0319828 A1 | | 12/2012 | Krauss et al. |
| 2013/0054118 A1 | | 2/2013 | Nagumo et al. |
| 2013/0096895 A1 | | 4/2013 | Willard et al. |
| 2013/0158898 A1 | | 6/2013 | Fukuda et al. |

FOREIGN PATENT DOCUMENTS

| | | |
|---|---|---|
| CN | 101354439 A | 1/2009 |
| DE | 10158032 A1 | 6/2003 |
| DE | 102008047923 A1 | 3/2010 |
| DE | 102010010620 A1 | 1/2011 |
| EP | 0903712 A2 | 3/1999 |
| JP | 2001119802 A | 4/2001 |
| JP | 2006112932 A | 4/2006 |
| JP | 2006115623 A | 4/2006 |
| JP | 3780521 B2 | 5/2006 |
| JP | 2007078699 A | 3/2007 |
| JP | 2007212975 A | 8/2007 |
| JP | 2007230446 A | 9/2007 |
| JP | 2009035049 A | 2/2009 |
| JP | 2010122148 A | 6/2010 |
| JP | 2011213311 A | 10/2011 |

OTHER PUBLICATIONS

Office Action of corresponding U.S. Appl. No. 14/471,148, dated Mar. 23, 2015, 20 pgs.
Office Action of corresponding U.S. Appl. No. 14/471,148, dated Nov. 4, 2015, 23 pgs.
Office Action of corresponding U.S. Appl. No. 14/471,148, dated Apr. 4, 2016, 6 pgs.

* cited by examiner

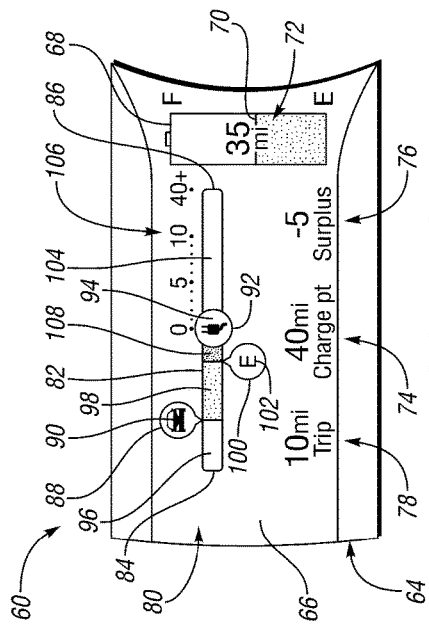
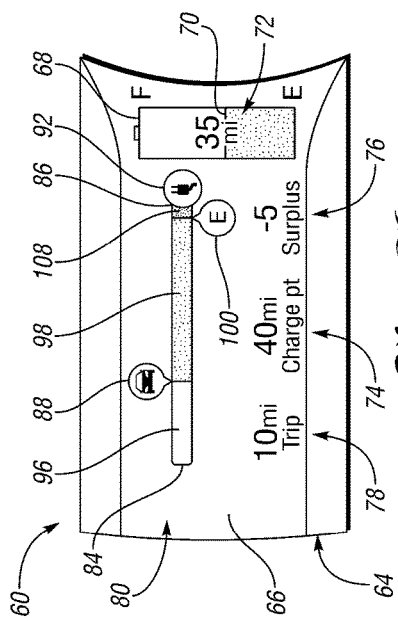
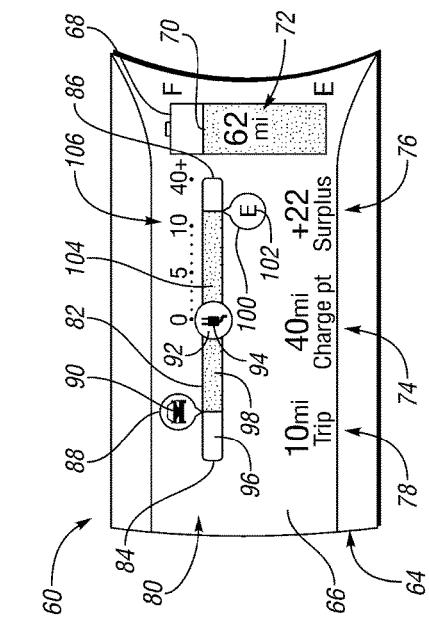
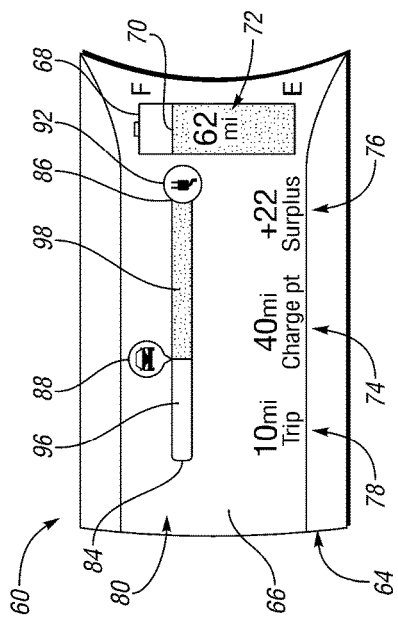

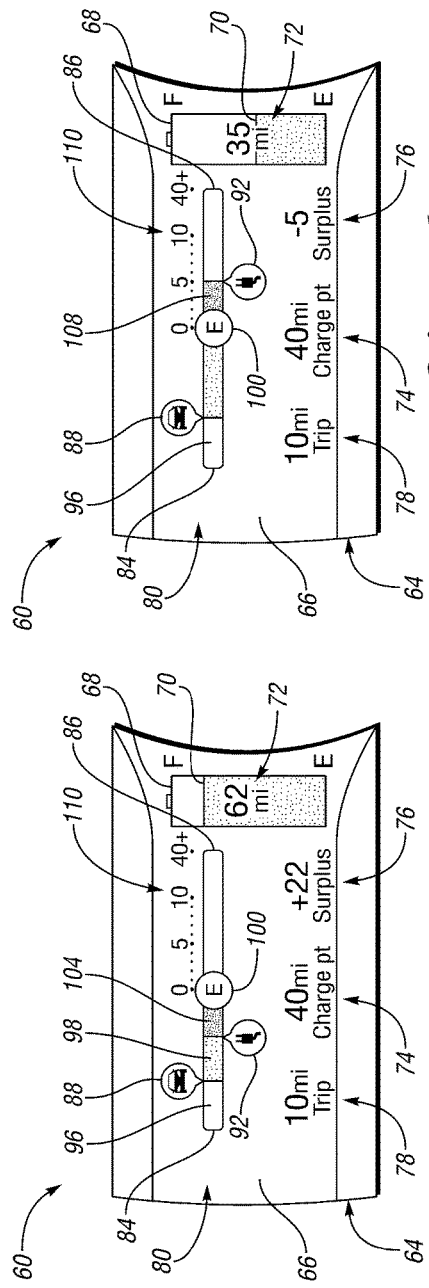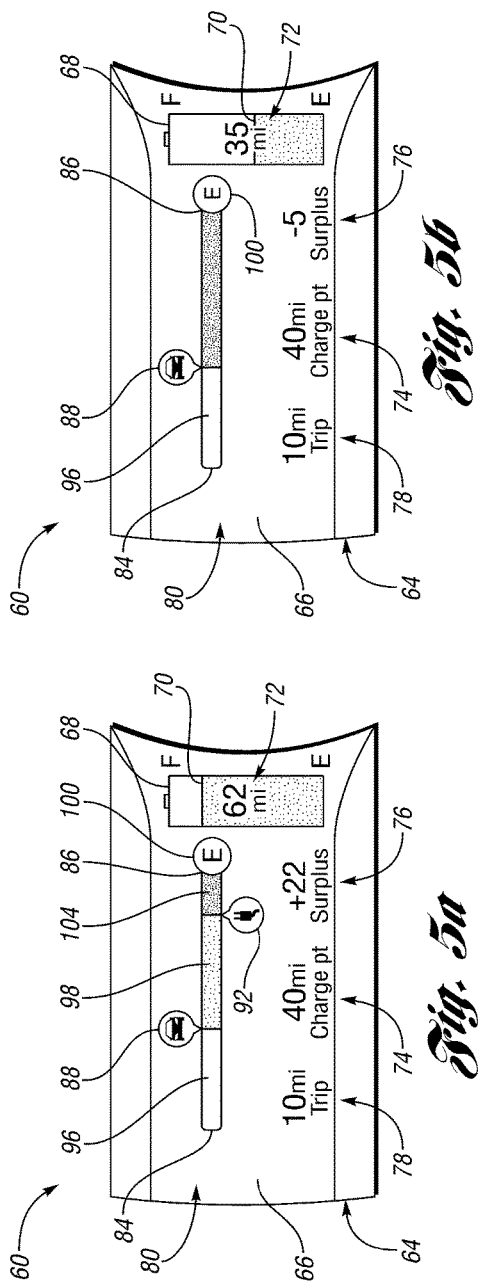

INFORMATION DISPLAY SYSTEM AND METHOD

CROSS-REFERENCE TO RELATED APPLICATIONS

This application is a continuation of U.S. application Ser. No. 12/985,717 filed Jan. 6, 2011, now U.S. Pat. No. 9,696,176, issued Jul. 4, 2017, the disclosure of which is hereby incorporated in its entirety by reference herein.

TECHNICAL FIELD

The present application relates to an information display system and method for a vehicle for graphically displaying vehicle range and destination information relative to each other and the vehicle location.

BACKGROUND

All vehicles, whether passenger or commercial, include a number of gauges, indicators, and various other displays to provide the vehicle operator with information regarding the vehicle and its surroundings. With the advent of new technologies, such as hybrid electric vehicles (HEVs), plug-in hybrid electric vehicle (PHEVs) and battery electric vehicles (BEVs), has come a variety of new gauges and information displays that help guide drivers to better learn, understand and trust the operation of these vehicles that utilize new technology. For example, many HEVs incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as a battery.

It is known that some drivers may not be able to achieve desired fuel economy or energy efficiency numbers, in part because of driving habits. In many cases, drivers are willing to modify their behavior, but are unable to translate recommended techniques into real changes in their driving habits. With the increase in sensing electronics, computers and other related technology on board a vehicle, the amount of information that can be communicated to the driver is virtually limitless. Often, the driver may not even know of all the features and capabilities their vehicle has to offer. Displaying certain types of information, particularly information relevant to HEVs, PHEVs or BEVs, can help facilitate economical driving choices.

SUMMARY

According to one or more embodiments of the present application, a trip gauge for a vehicle may include a first end associated with a trip start location and a second end. The trip gauge may further include a target indicator associated with a target location and disposed apart from the first end to indicate an overall distance between the trip start location and the target location. Further, the trip gauge may include a vehicle indicator associated with a vehicle location. The position of the vehicle indicator relative to the first end may indicate a current trip distance. The position of the vehicle indicator relative to the target indicator may indicate a current target distance. The target indicator may be disposed between the first end and the second end. Alternatively, the target indicator may be fixed at the second end.

The trip gauge may also include an empty indicator disposed between the vehicle indicator and the second end. The position of the empty indicator relative to the vehicle indicator may indicate an estimated vehicle range. The target indicator may be disposed between the vehicle indicator and the empty indicator when the estimated vehicle range exceeds the current target distance indicating a surplus of energy exists for the vehicle to reach the target location. The empty indicator may be disposed between the vehicle indicator and the target indicator when the current target distance exceeds the estimated vehicle range indicating insufficient energy is available for the vehicle to reach the target location. The target indicator may be static and the vehicle indicator and the empty indicator may move along the trip gauge relative to the target indicator. Alternately, the empty indicator may be static and the vehicle indicator and the target indicator may move along the trip gauge relative to the empty indicator. Moreover, the empty indicator may be disposed between the first end and the second end or the empty indicator may be fixed at the second end.

According to one or more additional embodiments, an information display system for a vehicle may include an information display and a controller in communication with the information display. The information display may include a trip gauge having a first end associated with a trip start location and a second end. Additionally, the trip gauge may include a target indicator associated with a target location and a vehicle indicator associated with a vehicle location. The controller may be configured to determine a current trip distance and a current target distance. Moreover, the controller may be configured to transmit signals causing the information display to adjust the position of the vehicle indicator based upon the current trip distance and the current target distance.

The trip gauge may further include an empty indicator disposed between the vehicle indicator and the second end. The position of the empty indicator relative to the vehicle indicator may indicate an estimated vehicle range. In this regard, the controller may be further configured to determine the estimated vehicle range and calculate a difference between the estimated vehicle range and the current target distance. Further, the controller may be configured to transmit signals causing the information display to adjust the position of the empty indicator relative to the target indicator based upon the difference between the estimated vehicle range and the current target distance.

The target indicator may be disposed between the vehicle indicator and the empty indicator when the estimated vehicle range exceeds the current target distance indicating an energy surplus exists for the vehicle to reach the target location. The amount of the energy surplus may correspond to the difference between the estimated vehicle range and the current target distance. The empty indicator may be disposed between the vehicle indicator and the target indicator when the current target distance exceeds the estimated vehicle range indicating an energy deficit exists for the vehicle to reach the target location. The amount of the energy deficit may correspond to the difference between the estimated vehicle range and the current target distance.

According to one or more additional embodiments, a display method for a vehicle may include determining a current target distance based upon a current vehicle location and a target destination. The method may further include estimating a current vehicle range based upon an amount of energy remaining in an energy storage device, calculating a difference between the current vehicle range and the current target distance, and displaying a trip gauge. The trip gauge may include a vehicle indicator associated with the current vehicle location and a target indicator associated with the target destination. The target indicator may be spaced apart from the vehicle indicator based upon the current target distance. The trip gauge may further include an empty indicator spaced apart from the vehicle indicator based upon the current vehicle range. Moreover, the empty indicator may be disposed relative to the target indicator based upon the difference between the current vehicle range and the current target distance.

The target indicator may be disposed between the vehicle indicator and the empty indicator when the current vehicle range exceeds the current target distance. The empty indicator may be disposed between the vehicle indicator and the target indicator when the current target distance exceeds the current vehicle range.

BRIEF DESCRIPTION OF THE DRAWINGS

FIG. 2a depicts an exemplary information display according to one or more embodiments of the present application;

FIG. 2b depicts an alternate view of the information display in FIG. 2a;

FIG. 3a depicts an exemplary information display according to one or more alternate embodiments of the present application;

FIG. 3b depicts an alternate view of the information display in FIG. 3a;

FIG. 4a depicts another exemplary information display according to one or more alternate embodiments of the present application;

FIG. 4b depicts an alternate view of the information display in FIG. 4a;

FIG. 5a depicts yet another exemplary information display according to one or more alternate embodiments of the present application; and FIG. 5b depicts an alternate view of the information display in FIG. 5a.

DETAILED DESCRIPTION

Figure 1:
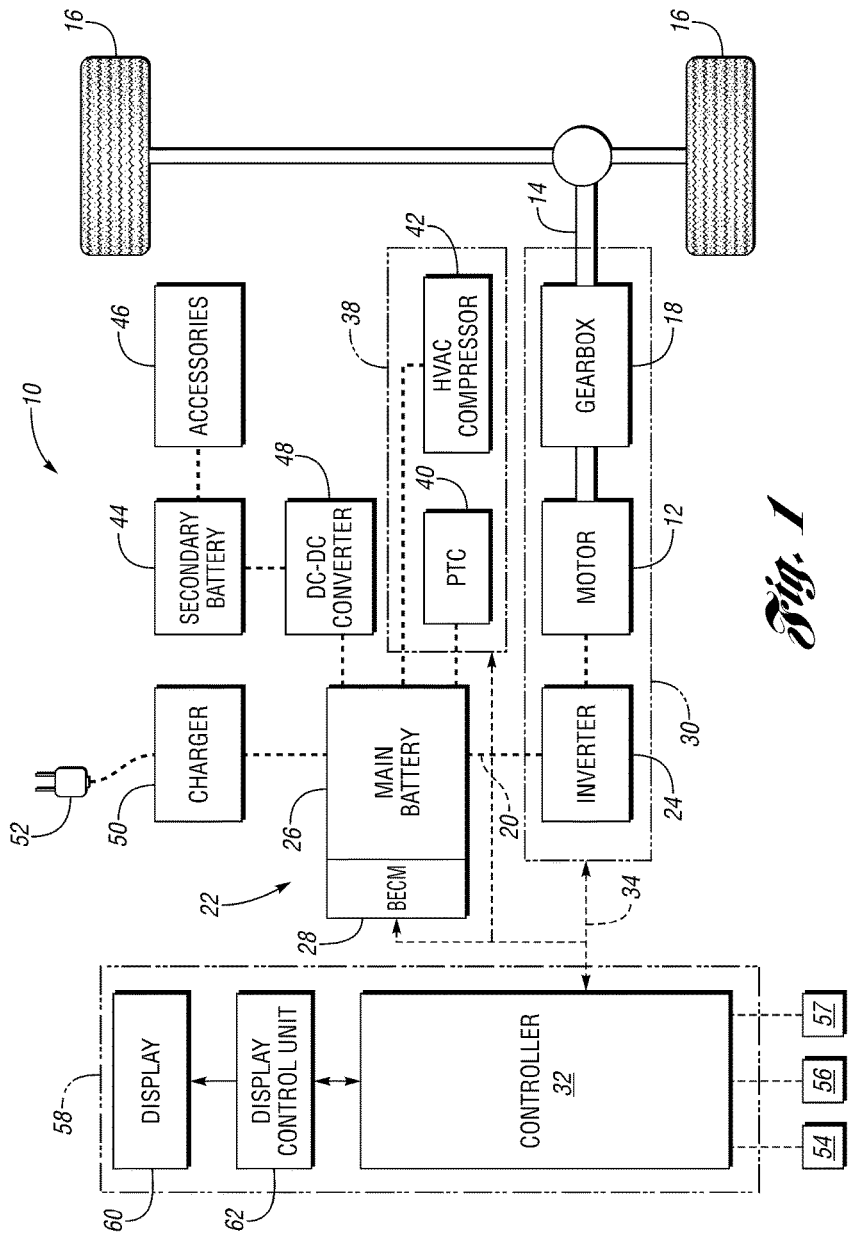
FIG. 1 is a simplified, exemplary schematic representation of a vehicle including an information display system according to one or more embodiments of the present application.

As required, detailed embodiments of the present application are disclosed herein; however, it is to be understood that the disclosed embodiments are merely exemplary of an invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ one or more embodiments of the present application.

Referring now to the drawings, FIG. 1 is a simplified, exemplary schematic representation of a vehicle 10. As seen therein, the vehicle 10 may be a battery electric vehicle (BEV), which is an all-electric vehicle propelled by one or more electric machines without assistance from an internal combustion engine. The one or more electric machines of the vehicle 10 may include a traction motor 12. The motor 12 may output torque to a shaft 14, which may be connected to a first set of vehicle drive wheels, or primary drive wheels 16, through a gearbox 18. Other vehicles within the scope of the present application may have different electric machine arrangements, such as more than one traction motor. In the embodiment shown in FIG. 1, the traction motor 12 can be used as a motor to output torque to propel the vehicle 10. Alternatively, the motor 12 can also be used as a generator, outputting electrical power to a high voltage bus 20 and to an energy storage system 22 through an inverter 24.

The energy storage system 22 may include a main battery 26 and a battery energy control module (BECM) 28. The main battery 26 may be a high voltage battery that is capable of outputting electrical power to operate the motor 12. According to one or more embodiments, the main battery 26 may be a battery pack made up of several battery modules. Each battery module may contain a plurality of battery cells. The battery cells may be air cooled using existing vehicle cabin air. The battery cells may also be heated or cooled using a fluid coolant system. The BECM 28 may act as a controller for the main battery 26. The BECM 28 may also include an electronic monitoring system that manages temperature and state of charge of each of the battery cells. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 12, the gearbox 18, and the inverter 24 may generally be referred to as a transmission 30. To control the components of the transmission 30, a vehicle control system, shown generally as a vehicle controller 32, may be provided. Although it is shown as a single controller, it may include multiple controllers that may be used to control multiple vehicle systems. For example, the controller 32 may be a vehicle system controller/powertrain control module (VSC/PCM). In this regard, the PCM portion of the VSC/PCM may be software embedded within the VSC/PCM, or it can be a separate hardware device.

A controller area network (CAN) 34 may allow the controller 32 to communicate with the transmission 30 and the BECM 28. Just as the main battery 26 includes a BECM, other devices controlled by the controller 32 may have their own controllers or sub-controllers. For example, the transmission 30 may include a transmission control module (TCM) (not shown), configured to coordinate control of specific components within the transmission 30, such as the motor 12 and/or the inverter 24. For instance, the TCM may include a motor controller. The motor controller may monitor, among other things, the position, speed, power consumption and temperature of the motor 12. Using this information and a throttle command by the driver, the motor controller and the inverter 24 may convert the direct current (DC) voltage supply by the main battery 26 into signals that can be used to drive the motor 12. Some or all of these various controllers can make up a control system, which, for reference purposes, may be the controller 32. Although illustrated and described in the context of the vehicle 10, which is a BEV, it is understood that embodiments of the present application may be implemented on other types of vehicles, such as those powered by an internal combustion engine, either alone or in addition to one or more electric machines (e.g., HEVs, PHEVs, etc.).

The vehicle 10 may also include a climate control system 38. The climate control system 38 may include both heating and cooling components. For instance, the climate control system 38 may include a high voltage positive temperature coefficient (PTC) electric heater and controller 40. The PTC 40 may be used to heat coolant that circulates to a passenger car heater. Heat from the PTC 40 may also be circulated to the main battery 26. The climate control system 38 may also include a high voltage electric HVAC compressor 42. Both the PTC 40 and the HVAC compressor 42 may draw electrical energy directly from the main battery 26. Moreover, the climate control system 38 may communicate with the controller 32. The on/off status of the climate control system 38 can be communicated to the controller 32, and can be based on, for example, the status of an operator actuated switch, or the automatic control of the climate control system 38 based on related functions such as window defrost.

In addition to the main battery 26, the vehicle 10 may include a separate, secondary battery 44, such as a typical 12-volt battery. The secondary battery 44 may be used to power the vehicle's various other accessories, headlights, and the like (collectively referred to herein as accessories 46). A DC-to-DC converter 48 may be electrically interposed between the main battery 26 and the secondary battery 44. The DC-to-DC converter 48 may allow the main battery 26 to charge the secondary battery 44.

The vehicle 10, which is shown as a BEV, may further include an alternating current (AC) charger 50 for charging the main battery 26 using an off-vehicle AC source. The AC charger 50 may include power electronics used to convert the off-vehicle AC source from an electrical power grid to the DC voltage required by the main battery 26, thereby charging the main battery 26 to its full state of charge. The AC charger 50 may be able to accommodate one or more conventional voltage sources from an off-vehicle electrical grid (e.g., 110 volt, 220 volt, etc.). The AC charger 50 may be connected to the off-vehicle electrical grid using an adaptor, shown schematically in FIG. 1 as a plug 52.

Also shown in FIG. 1 are simplified schematic representations of a braking system 54, an acceleration system 56, and a navigation system 57. The braking system 54 may include such things as a brake pedal, position sensors, pressure sensors, or some combination of the two, as well as a mechanical connection to the vehicle wheels, such as the primary drive wheels 16, to effect friction braking. The braking system 54 may also include a regenerative braking system, wherein braking energy may be captured and stored as electrical energy in the main battery 26. Similarly, the acceleration system 56 may include an accelerator pedal having one or more sensors, which, like the sensors in the braking system 54, may communicate information such as throttle input to the controller 32. The navigation system 57 may include a navigation display, a global positioning system (GPS) unit, a navigation controller and inputs for receiving destination information or other data from a driver. The navigation system may also communicate distance and/or location information associated with the vehicle 10, its target destinations, or other relevant GPS waypoints. The controller 32 may communicate with each individual vehicle system to monitor and control vehicle operation according to programmed algorithms and control logic. In this regard, the controller 32 may help manage the different energy sources available and the mechanical power being delivered to the wheels 16 in order to maximize the vehicle's range. The controller 32 may also communicate with a driver as well.

In addition to the foregoing, the vehicle 10 may include an information display system 58 to facilitate communications with a driver. As explained in detail below, the information display system 58 may provide relevant vehicle content to a driver of the vehicle 10 before, during or after operation. As shown in FIG. 1, the information display system 58 may include the controller 32 and an information display 60. The information display system 58 may also include its own control system, which, for reference purposes, may be a display control unit 62. The display control unit 62 may communicate with the controller 32 and may perform control functions on the information display 60, although the controller 32 may also function as the information display's control system. The controller 32 may be configured to receive input that relates to current operating conditions of the vehicle 10. For instance, the controller 32 may receive input signals from the BECM 28, the transmission 30 (e.g., motor 12 and/or inverter 24), the climate control system 38, the braking system 54, the acceleration system 56, or the like. The controller 32 may provide output to the display control unit 62 such that the information display 60 conveys energy consumption and range information, or other information relating to the operation of the vehicle 10 to a driver.

The information display 60 may be disposed within a dashboard (not shown) of the vehicle 10, such as an instrument panel or center console area. Moreover, the information display 60 may be part of another display system, such as the navigation system 57, or may be part of a dedicated information display system. The information display 60 may be a liquid crystal display (LCD), a plasma display, an organic light emitting display (OLED), or any other suitable display. The information display 60 may include a touch screen for receiving driver input associated with selected areas of the information display 60. The information display system 58 may also include one or more buttons (not shown), including hard keys or soft keys, located adjacent the information display 60 for effectuating driver input. Other operator inputs known to one of ordinary skill in the art may also be employed without departing from the scope of the present application.

Referring generally to FIGS. 2a-5b, the information display 60 is shown in greater detail in accordance with one or more embodiments of the present application. As seen therein, the information display 60 may display one or more display screens 64 that may change to convey different information to the driver. To that end, the one or more display screens 64 may be selectable or non-selectable and may transition upon receipt of driver or vehicle input at the controller 32 and/or display control unit 62.

As shown in FIGS. 2a-b, the one or more display screens 64 of the information display 60 may include a range view 66, which may convey range information associated with the vehicle 10. The range view 66 may include a battery gauge 68 having a battery state of charge (SOC) indicator 70. The SOC indicator 70 may convey the relative amount of electrical energy remaining in the main battery 26. BEVs may have a limited range or distance that can be traveled before the main battery 26 is depleted. Accordingly, the range of a vehicle may also be referred to as its distance to empty (DTE) value. To convey the DTE value, the battery gauge 68 may also include a DTE indicator 72. As shown in FIG. 2a-b, the DTE indicator 72 may be a digital data readout of the DTE value in units of distance (e.g., miles, kilometers, etc.) Alternatively, the DTE indicator 72 may be displayed elsewhere on the budget screen 66.

How the vehicle 10 is driven can be an important factor in determining how long the remaining charge in the main battery 26 is expected to last. For instance, aggressive driving behavior may deplete the main battery 26 more rapidly than relatively conservative driving behavior. To this end, the vehicle's estimated range or DTE value may be based not only upon the amount of battery energy available in the main battery 26, but also upon an energy consumption profile. The energy consumption profile may correspond to an anticipated rate of energy consumption based on several factors. For example, the energy consumption profile may correspond to a theoretical or global average rate of energy consumption for all types of drivers. According to one or more embodiments, the energy consumption profile from which the DTE is estimated may correspond to an average rate of energy consumption for the vehicle 10 or one of the vehicle's drivers. For instance, each driver of the vehicle 10 may be assigned a key ID identifying themselves to the vehicle 10. This may allow driver preferences, setting or other profile information, such as an energy consumption profile, to be stored and recalled for each driver. The key ID may be input to the vehicle either actively or passively at startup. For example, each driver may manually enter a code associated with their key ID. Alternatively, the key ID may be automatically transmitted to the vehicle 10 using radio frequency (RF) technology. In particular, the key ID may be an RFID stored in a driver's key or key fob that, when interrogated, transmits the driver's ID to the vehicle 10. Whether the energy consumption profile is associated with the vehicle 10 in general or an individual driver of the vehicle 10, the energy consumption profile may correspond to a lifetime average energy consumption rate or an average energy consumption rate for a past distance traveled, period of time or some other relevant event. The vehicle's estimate range may also factor in weather conditions, traffic conditions, information from the navigation system 57 (e.g., terrain, speed limits, traffic control elements, etc.), an instantaneous energy consumption rate, or the like. The operation of the vehicle 10 may be continuously monitored and analyzed in order to determine the impact of driving behavior on the vehicle's range. As described, the controller 32 may take into account past driving behavior, current driving behavior, and/or predicted future driving behavior when assessing the vehicle's range and constantly updating the estimated DTE value.

As mentioned previously, BEVs may have limited range; they may also have limited opportunities to recharge. In order to inform drivers whether they will be able to make it to their next charge point, the range view 66 may also convey information corresponding to a target. The target may be a destination, either intermediate or final, such as a charging location. Moreover, the target may be designated by the navigation system 57 with or without driver input. Alternatively, the target information may correspond to a distance value input to the controller 32, either directly or indirectly. Whether initially entered as a destination (e.g., navigation waypoint) or a distance, the target information may correspond to a current distance from the vehicle to the target, referred to as a target distance. Thus, in addition to the battery gauge 68, the range view 66 may include a distance to target (DTT) 74 indicator corresponding to the current target distance. As previously mentioned, the target distance may correspond to the current distance from the vehicle 10 to a destination, such as the next charging location. Similar to the DTE indicator 72, the DTT indicator 74 may also be a digital data readout of the target distance value.

The information display system 58 may convey vehicle range information and target distance information to provide drivers with reassurance that they will be able to make it to their next charge point. If they are unable to reach their destination, the range view 66 may also provide drivers plenty of warning so they can either modify their driving behavior in order to reach their target or change their target destination. When the target distance is less than the vehicle range (e.g., DTE value), the vehicle 10 may be considered to be operating with an energy surplus. Conversely, when the target distance exceeds the vehicle range, then the vehicle 10 may be considered to be operating with an energy deficit or "debt." Accordingly, the range view 66 may further include a status indicator 76 to convey to a driver whether the vehicle 10 has sufficient electrical energy to reach its intended target. The status indicator 76 may also convey the magnitude or amount of the debt/surplus in units of distance. Like the DTE indicator 72 and the DTT indicator 74, the status indicator 76 may also be a digital data readout. As shown in FIG. 2*a-b*, the amount of the energy surplus (deficit) may be obtained by subtracting the current target distance value from the DTE value. In addition to the DTE indicator 72 and the DTT indicator 74, the range view 66 may include a trip distance indicator 78. The trip distance indicator 78 may correspond to a current trip distance. For example, the current trip distance may be the distance the vehicle has traveled since the start of a trip and may be associated with the odometer mileage between a trip start location and the current vehicle location. According to one or more embodiments, the trip start location may reset each time vehicle is started or may only be reset upon specific driver input.

In addition to being shown as digital data, vehicle trip information, range information and target information may also be conveyed graphically to provide a more qualitative visualization of the vehicle's location relative to a target location and an estimated empty or zero charge location. The zero charge location may correspond to an estimated location in which the energy available from the main battery 26 to propel the vehicle 10 will be depleted. Thus, the zero charge location may be based on the estimate of the DTE value. To this end, the range view 66 may further include a trip gauge 80. The trip gauge 80 may graphically display the distance needed for the vehicle 10 to reach a designated charging location or some other target (e.g., the target distance) as well as an overlay of the expected range of the vehicle 10 relative to the target distance. As previously described, the difference between the target distance and the vehicle range may indicate whether the vehicle 10 has a surplus of charge in the main battery 26 (energy surplus) to make its destination, or rather a debt (energy deficit) indicating that the vehicle 10 is not projected to make it to the destination at the current energy consumption level. Accordingly, the trip gauge 80 may help inform drivers whether they are likely to reach their target destination or not so that driving behavior or, alternately, the target destination, can be modified accordingly.

With reference to FIGS. 2*a-b*, the trip gauge 80 may include a line or bar 82 having a first end 84 and a second end 86. The bar 82 may be straight, as shown, or may be variously-shaped. For example, the bar 82 may be arc-shaped or may comprise one or more line segments. The trip gauge 80 may convey distance as a linear scale. In this regard, the first end 84 may correspond to the trip start location. The trip gauge 80 may further include a vehicle indicator 88 corresponding to a current location of the vehicle 10 relative to the trip start location. Thus, the position of the vehicle indicator 88 relative to the first end 84 may correspond to the current trip distance. The vehicle indicator 88 may be a marker or some other element identifying and indicating the relative location of the vehicle 10 on the trip gauge 80. According to one or more embodiments, the vehicle indicator 88 may include a vehicle icon 90.

The trip gauge 80 may also include a target indicator 92 corresponding to a target location (e.g., charging location). The target indicator 92 relative to the first end 84 may correspond to an overall distance between the trip start location and the target location. Moreover, the target indicator 92 relative to the vehicle indicator 88 may correspond to the target distance. Like the vehicle indicator 88, the target indicator 92 may be a marker or some other element identifying and indicating the relative location of the target destination. According to one or more embodiments, the target indicator 92 may include a plug icon 94. Of course, alternate icons may be employed by the information display system 58 in connection with the vehicle indicator 88 and the target indicator 92 without departing from the scope of the present application. For instance, the target indicator 92 may include a bull's-eye, pin, flag, or the like suitable for indicating a target destination such as a designated charging location.

According to one or more embodiments of the present application, the target indicator 92 may be fixed at a particular position on the trip gauge 80 and the vehicle indicator 88 may move along the trip gauge 80 relative to the target indicator 92 and the trip start location based on the current trip distance and the current target distance. In the exemplary information display 60 shown in FIGS. 2a-b, the current trip distance is 10 miles as conveyed by the trip distance indicator 78 and the current target distance is 40 miles as conveyed by the DTT indicator 74. Thus, the overall distance between the trip start location and the target location is 50 miles. The controller 32 may calculate the ratio of the trip distance to the overall distance when determining where to position the vehicle indicator 88 on the trip gauge 80. Accordingly, the vehicle indicator may be displayed approximately one-fifth ($\frac{1}{5}^{th}$) of the way between the first end 84 and the target indicator 92 (10 miles/50 miles=0.20). Of course, the positions of the elements of the trip gauge 80 may not necessarily be to scale. Instead, the vehicle indicator 88, for example, may only be displayed along the trip gauge 80 to convey an approximate or general relation of the vehicle location to the trip start location and/or the target location.

The trip gauge 80 may also include a trip distance region 96 associated with the current trip distance. Accordingly, the trip distance region 96 may correspond to the section of the trip gauge 80 between the first end 84 and the vehicle indicator 88. According to one or more embodiments of the present application, the trip distance region 96 may be used to convey a history of vehicle performance, such as its energy efficiency. For example, the trip distance region 96 may exhibit one color to convey periods of relatively efficient vehicle operation and another color to convey periods of relatively inefficient vehicle operation. Similar to the trip distance region 96, the trip gauge 80 may include a target distance region 98 associated with the current target distance. Accordingly, the target distance region 98 may correspond to the section of the trip gauge 80 between the vehicle indicator 88 and the target indicator 92.

According to one or more embodiments, the trip gauge may further include an empty indicator 100. The empty indicator 100 may be associated with the estimated empty or zero charge location based on the range of the vehicle 10 (e.g., the DTE value). Accordingly, the position of the empty indicator 100 relative to the vehicle indicator 88 may correspond to the DTE value and provide a relative indication of the vehicle's range. Moreover, the empty indicator 100 may convey the range of the vehicle 10 relative to the target distance. Like the vehicle indicator 88 and the target indicator 92, the empty indicator 100 may also be a marker or some other gauge element identifying and indicating the relative location of the zero charge location. According to one or more embodiments, the empty indicator 100 may include an "E" icon 102 symbolizing an empty energy storage device such as the main battery 26, though other icons, images or symbols may also be utilized.

As shown in FIG. 2a, the target indicator 92 may be disposed between the vehicle indicator 88 and the empty indicator 100 when the estimated vehicle range exceeds the current target distance. As a result, the exemplary information display shown in FIG. 2a may indicate that a surplus of charge exists in the main battery 26 (e.g., an energy surplus) for the vehicle 10 to reach its target destination. Conversely, with reference to FIG. 2b, the empty indicator 100 may be disposed between the vehicle indicator 88 and the target indicator 92 when the current target distance exceeds the estimated vehicle range. Consequently, the exemplary information display shown in FIG. 2b may indicate that there is insufficient energy available in the main battery 26 (e.g., an energy deficit or debt) for the vehicle to reach its target destination. Thus, the trip gauge 80 may visually convey whether the vehicle can successfully make it to its destination based on the position of the empty indicator 100 relative to the vehicle indicator 88 and the target indicator 92.

The trip gauge 80 may also help convey to a driver the relative importance of the displayed content at any given time. For example, near a start of a trip, a driver may see that the estimated zero charge location is fairly close to the target destination, but there may be a relatively long distance for the vehicle 10 to travel to reach the destination. Accordingly, the content of the information display 60, in particular the trip gauge 80, may encourage the driver to carefully monitor the driving environment as well as his or her driving behavior during the trip to ensure that the target destination is successfully reached. On the other hand, a situation may occur where the target distance is relatively small and the battery energy available is relatively large. For example, the vehicle 10 may only have 5 miles to go to reach the destination, but 25 miles worth of additional charge in the main battery 26 (i.e., DTE=25 miles). In such situations, the trip gauge 80 may convey to a driver that there is little risk that the vehicle 10 will not make it to the target destination based on the relative locations of the vehicle indicator 88, target indicator 92 and empty indicator 100.

As previously described, the target indicator 92 may be fixed anywhere along the trip gauge 80. According to one or more embodiments, the target indicator 92 may be fixed on the trip gauge 80 approximately midway between the first end 84 and the second end 86, as shown in FIGS. 2a-b. In this manner, trip gauge 80 may further include a surplus region 104 corresponding to the portion of the trip gauge 80 between the target indicator 92 and the second end 86. Moreover, a surplus scale 106 may be associated with the surplus region 104. Accordingly, the trip gauge 80 may convey when an energy surplus exists as well as delineate the actual or relative magnitude of the energy surplus when the empty indicator 100 is disposed in the surplus region 102. In the example shown in FIG. 2a, the vehicle range is 62 miles and the target distance is 40 miles. Thus, the energy surplus is 22 miles (62−40=22). As a result, the empty indicator 100 may be disposed in the surplus region 104 adjacent a corresponding portion of the surplus scale 106 indicating the estimated 22 miles of additional battery charge beyond the target. The surplus scale 106 may linear, non-linear, or include portions of both. If the energy surplus exceeds the limits of the surplus scale 106, the empty indicator 100 may be displayed all the way at the second end 86, or may not be displayed on the trip gauge 80 at all.

In the example shown in FIG. 2b, the vehicle range is 35 miles and the target distance is 40 miles. Accordingly, the energy surplus is negative five miles (35−40=−5) or, stated differently, the energy deficit is 5 miles. Consequently, the empty indicator 100 is disposed between the vehicle indicator 88 and the target indicator 92. When this occurs, the region between the empty indicator 100 and the target indicator 92 may correspond to a debt region 108. The relative position of the empty indicator 100 between the vehicle indicator 88 and the target indicator 92 may indicate the relative magnitude of the energy deficit and, in turn, the size of the debt region 108.

Variations to the trip gauge 80 can be made to emphasize different pieces of information. For instance, as shown in FIGS. 3a-b, the target indicator 92 may be fixed at the second end 86 of the trip gauge 80, with the empty indicator 100 displayed only if the zero charge location is located before the target destination indicating an energy deficit. In this manner, the trip gauge 80 may convey the projected failure to reach a target destination more prominently.

According to one or more additional embodiments, the empty indicator 100 may be fixed on the trip gauge 80 while the vehicle indicator 88 and the target indicator 92 move along the trip gauge 80 relative to the empty indicator 100. In this manner, the trip gauge 80 may emphasize the remaining distance to the zero charge location and/or the target destination, perhaps while deemphasizing the distance already traveled (e.g., the current trip distance). For example, with reference to FIGS. 4a-b, the empty indicator 100 may be fixed somewhere between the first end 84 and the second end 86 of the trip gauge 80. In this embodiment, rather than a surplus scale 106, the trip gauge 80 may include a debt scale 110 for more accurately conveying the magnitude of an energy deficit, should it exist, as illustrated in FIG. 4b in particular. As another example, with reference to FIGS. 5a-b, the empty indicator 100 may be fixed at the second end 86 of the trip gauge 80. Moreover, the target indicator 92 may only be displayed if the target destination is located before the zero charge location indicating an energy surplus. In this manner, the trip gauge 80 may convey the projected success in reaching a target destination more prominently.

The information display 60 may be updated to reflect any ongoing changes to the vehicle or system state. For example, if a driver takes a detour to the target from an expected or programmed route, the vehicle 10 may consult the navigation system 57 to determine a new target distance. In addition, updates to the estimated vehicle range (e.g., DTE value) may be communicated to the information display 60, and subsequently conveyed to a driver, in real-time. In this manner, the controller 32 may receive input from one or more of the BECM 28, transmission 30, climate system 38, breaking system 54, acceleration system 56, navigation system 57 and the like corresponding to information associated with the content displayed by the information display 60. Using this input, the controller 32 may determine, calculate and/or estimate trip distance values, target distance values, vehicle range values, or the like. Additionally, the controller 32 may determine whether vehicle 10 has either an energy surplus or an energy deficit based on a comparison of the estimated vehicle range and the current target distance. Moreover, the controller 32 may calculate the difference between the estimated vehicle range and the current target distance to determine the magnitude of an energy surplus or deficit. Further, the controller 32 may transmit or output signals causing the information display 60 to adjust the position of the vehicle indicator 88, target indicator 92, and/or empty indicator 100 based at least upon the current trip distance, the current target distance, and the estimated vehicle range.

When no target information is provided, the vehicle 10 may predict a target distance based on past driving history, such as average trip distance or some other available metric. Alternatively, if a target distance or destination is not entered by a driver or is otherwise unavailable, the estimated DTE value at that time may be used as an initial substitute value for the target distance. Moreover, the current target distance may be obtained by counting down from the initial DTE estimate based on the actual distance traveled (e.g., odometer mileage) since the initial DTE estimate was established. When using a DTE estimate as a default substitute value when a target distance is not entered or becomes unavailable, the trip gauge 80 may help coach drivers to at least obtain the initially estimated DTE. Since the estimated vehicle range or DTE value may be based on an energy consumption profile for a driver, the trip gauge 80 may provide an indication of the driver's current driving behavior against himself or herself. Moreover, the labels on the DTT indicator 74 and the status indicator 76 may change when a DTE estimate is substituted as the basis for the target distance to reflect the difference in the information being conveyed. For example, the label for the DTT indicator 74 may switch from "charge point" or a similar term to "budget" or another similar term. Similarly, the label for the status indicator 76 may switch from "surplus" or a similar term to "status" or another similar term.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An information display system for a vehicle comprising:
    an information display including a trip gauge having a static first end associated with a trip start location, a static second end, a vehicle indicator associated with a vehicle location, a static target indicator associated with a target location and disposed between the vehicle indicator and the second end, and an empty indicator whose position relative to the vehicle indicator indicates an estimated vehicle range; and
    a controller in communication with the information display and configured to:
        calculate a current trip distance,
        obtain a current target distance, and
        transmit signals causing the information display to adjust the position of the vehicle indicator based upon the current trip distance and the current target distance.

2. The information display system of claim 1, wherein the controller is further configured to:
    calculate the estimated vehicle range;
    calculate a difference between the estimated vehicle range and the current target distance; and
    transmit signals causing the information display to adjust the position of the empty indicator relative to the target indicator based upon the difference between the estimated vehicle range and the current target distance.

3. The information display system of claim 2, wherein the target indicator is disposed between the vehicle indicator and the empty indicator when the estimated vehicle range exceeds the current target distance indicating an energy surplus exists for the vehicle to reach the target location.

4. The information display system of claim 3, wherein an amount of the energy surplus corresponds to the difference between the estimated vehicle range and the current target distance.

5. The information display system of claim 2, wherein the empty indicator is disposed between the vehicle indicator and the target indicator when the current target distance exceeds the estimated vehicle range indicating an energy deficit exists for the vehicle to reach the target location.

6. The information display system of claim 5, wherein an amount of the energy deficit corresponds to the difference between the estimated vehicle range and the current target distance.

7. A display method comprising:
 obtaining a current target distance based upon a current vehicle location and a target destination;
 estimating a current vehicle range based upon an amount of energy remaining in an energy storage device;
 calculating a difference between the current vehicle range and the current target distance; and
 displaying a trip gauge including:
  a vehicle indicator associated with the current vehicle location,
  a static target indicator associated with the target destination and spaced apart from the vehicle indicator based upon the current target distance, and
  an empty indicator spaced apart from the vehicle indicator based upon the current vehicle range and disposed relative to the target indicator based upon the difference between the current vehicle range and the current target distance.

8. The method of claim 7, wherein the target indicator is disposed between the vehicle indicator and the empty indicator when the current vehicle range exceeds the current target distance.

9. The method of claim 7, wherein the empty indicator is disposed between the vehicle indicator and the target indicator when the current target distance exceeds the current vehicle range.

10. The method of claim 7, wherein the trip gauge further includes a first end and a second end, and the target indicator is fixed at the second end.

11. The method of claim 7, wherein the trip gauge further includes a first end and a second end, and the target indicator is disposed between the first end and the second end.

* * * * *